United States Patent
Park et al.

(10) Patent No.: US 10,637,713 B2
(45) Date of Patent: Apr. 28, 2020

(54) REMOTE CONTROLLER THAT GENERATES FORCE FEEDBACK USING ELECTROMAGNETS

(71) Applicant: HANWHA DEFENSE CO., LTD., Changwon-si, Gyeongsangnam-do (KR)

(72) Inventors: Sang Woong Park, Changwon-si (KR); Gap Seong Kim, Changwon-si (KR)

(73) Assignee: HANWHA DEFENSE CO., LTD., Changwon-si (KR)

(*) Notice: Subject to any disclaimer, the term of this patent is extended or adjusted under 35 U.S.C. 154(b) by 0 days.

(21) Appl. No.: 16/157,646

(22) Filed: Oct. 11, 2018

(65) Prior Publication Data

US 2019/0109754 A1    Apr. 11, 2019

(30) Foreign Application Priority Data

Oct. 11, 2017    (KR) .................. 10-2017-0129572

(51) Int. Cl.
*H04L 29/08*    (2006.01)
*H04L 29/10*    (2006.01)
(Continued)

(52) U.S. Cl.
CPC .......... *H04L 29/08099* (2013.01); *G06F 3/01* (2013.01); *G06F 3/016* (2013.01);
(Continued)

(58) Field of Classification Search
CPC ... G06F 3/016; G06F 3/048; H04L 29/08099; H04L 29/10; H04L 67/025; G05G 2009/0474; G05G 2009/04755; G05G 9/047; G05G 9/04; H02K 2201/18; H02K 23/00; H02K 26/00; H02K 29/12; H02K 41/03; H02K 41/0352; B66B 1/304; G05B 2219/37124; G05B 2219/41327; G05B 2219/41345; G09B 23/285; H02P 21/24; H02P 6/183; H02P 6/185; Y10S 414/135;
(Continued)

(56) References Cited

U.S. PATENT DOCUMENTS

| | | | | |
|---|---|---|---|---|
| 5,911,627 A | | 6/1999 | Piot et al. | |
| 6,002,184 A | * | 12/1999 | Delson | H02K 23/00 |
| | | | | 273/148 R |
| 2014/0374194 A1 | * | 12/2014 | Stolt | H02P 6/183 |
| | | | | 187/247 |

FOREIGN PATENT DOCUMENTS

KR    10-0851112 B1    8/2008

* cited by examiner

*Primary Examiner* — Dionne Pendleton
(74) *Attorney, Agent, or Firm* — Sughrue Mion, PLLC

(57) ABSTRACT

Provided is a remote controller for controlling an object placed in a remote location. The remote controller may include: a communication interface configured to form a communication channel with the object; an operator including an input interface configured to receive a user input, and at least one first magnet; a movement sensor configured to detect a movement of the operator generated by the user input, and measure characteristics of the movement of the operator; at least one second magnet disposed around the first magnet; a controller configured to, in response to the detection of the movement, apply a current to at least one of the first magnet and the second magnet to generate a magnetic force applied to the operator, wherein the controller is further configured to adjust the current to change the magnetic force according to the measured characteristics of the movement of the operator.

16 Claims, 10 Drawing Sheets

(51) Int. Cl.
 G06F 3/01 (2006.01)
 G06F 3/048 (2013.01)
 H02K 29/12 (2006.01)
 G06F 3/033 (2013.01)
(52) U.S. Cl.
 CPC ............ G06F 3/033 (2013.01); G06F 3/048 (2013.01); H02K 29/12 (2013.01); H04L 29/08 (2013.01); H04L 29/10 (2013.01); H04L 67/025 (2013.01); *G06F 2203/04105* (2013.01)
(58) Field of Classification Search
 CPC ... A61B 2034/742; A61B 34/70; A61B 34/71; A61B 34/76; Y10T 74/20201
 See application file for complete search history.

REMOTE CONTROLLER THAT GENERATES FORCE FEEDBACK USING ELECTROMAGNETS

CROSS REFERENCE TO THE RELATED APPLICATION

This application claims priority from Korean Patent Application No. 10-2017-0129572, filed on Oct. 11, 2017, in the Korean Intellectual Property Office, the disclosure of which is incorporated herein by reference in its entirety.

BACKGROUND

1. Field

Exemplary embodiments of the inventive concept relate to a remote controller, and more particularly, to a remote controller that generates force feedback using electromagnets.

2. Description of the Related Art

Remote controllers include controllers for controlling movement of an object disposed at a remote place in a narrow sense and controllers for controlling movement of an object in a simulation in a broad sense. Remote controllers are used to control movement of various objects such as air vehicles, automobiles and robots and are used to control various movements such as six degrees of freedom (6-DOF) motion of an air vehicle, three degrees of freedom (3-DOF) motion of an automobile, and motion of a robot arm.

Due to the nature of a remote controller that does not directly operate an object, a user cannot feel the movement of the object according to the result of control by the remote controller. That is, the user receives only a limited feedback on the control result compared to when directly operating the object by, for example, boarding the object. This limited feedback may result in generation of a control command that causes overload or failure in the object.

A force feedback is a function that can provide an enhanced feedback to a remote controller. A force returns to a control stick of a force feedback applied remote controller as a result of control, and a user can get a feedback on movement of an object through a force transmitted to the control stick.

A related art remote controller generates a force feedback through torque control by having a motor and a decelerator mounted in a control stick and an electronic board for driving the motor. In this case, however, it is difficult to miniaturize the remote controller due to the size and complicated configuration of parts.

SUMMARY

Exemplary embodiments of the inventive concept provide a remote controller that generates force feedback using electromagnets in order to enable miniaturization.

Exemplary embodiments of the inventive concept also provide a remote controller that generates force feedback adjusted according to the state of an object.

Exemplary embodiments of the inventive concept also provide a method of miniaturizing a force feedback applied remote controller.

Exemplary embodiments of the inventive concept also provide a method of generating and adjusting force feedback in a remote controller using electromagnets.

However, various aspects of the inventive concept is not restricted to the exemplary embodiments set forth herein. Other aspects of the inventive concept will become more apparent to one of ordinary skill in the art to which the inventive concept pertains by referencing the detailed description of the exemplary embodiments given below.

According to an aspect of an exemplary embodiment, there is provided a remote controller for controlling an object placed in a remote location. The remote controller may include: a communication interface configured to form a communication channel with the object; an operator comprising an input interface configured to receive a user input, and a force feedback actor comprising a first magnet; a movement sensor configured to detect a movement of the operator generated by the user input, and measure characteristics of the movement of the operator; a controller configured to control the object through the communication interface, and generate a control signal according to the detected movement of the operator; a current generator configured to generate a current according to the control signal; and a force feedback generator comprising at least one second magnet configured to receive the generated current, thereby to generate a magnetic force as a force feedback which is applied to the force feedback actor, wherein the controller is further configured to control the current generator to adjust the current according to the measured characteristics of the movement of the operator, and the force feedback generator is configured to, in response to the adjusted current, generate a different magnetic force changing the force feedback.

The characteristics of the movement of the operator may include at least one of an amount of a movement displacement, a relative position, and movement speed of the object. The communication interface may be configured to receive state information about the object, and the controller may be configured to control the current generator to adjust the current according to both the measured characteristics of the movement of the operator and the state information about the object. The state information about the object may include at least one of a weight of a thing loaded on the object, travelling speed of the object, and a movement direction of the object. The controller may be configured to generate a control signal for generating a maximum magnetic force when a value of the state information exceeds a predetermined maximum value. The controller may be further configured to selectively apply a weight according to the state information about the object to control the current generator to adjust the current according to the state information about the object. The controller may be configured to apply the weight when a value of the state information is equal to or greater than a reference value, and not to apply the weight when the value of the state information is less than the reference value.

The first magnet included in the force feedback actor may be a permanent magnet, and the second magnet included in the force feedback generator may be an electromagnet. Alternatively, the first magnet may be an electromagnet configured to generate another magnetic force in response to another current generated by the current generator according to the control signal of the controller. The second magnet may include a plurality of second magnets surrounding the force feedback actor with respective distances such that an end of each of the second magnets is disposed adjacent to an end of the first magnet.

According to an exemplary embodiment, there is provided a remote controller, for remotely controlling an object, which may include: a communication interface configured to form a communication channel with the object; an operator including an input interface configured to receive a user input, and at least one first magnet; a movement sensor configured to detect a movement of the operator generated by the user input, and measure characteristics of the movement of the operator; at least one second magnet disposed around the first magnet; a controller configured to, in response to the detection of the movement, apply a current to at least one of the first magnet and the second magnet to generate a magnetic force applied to the operator, wherein the controller is further configured to adjust the current to change the magnetic force according to the measured characteristics of the movement of the operator.

The controller may be further configured to receive state information about the object being controlled by the remote controller, and apply a weight to the magnetic force changed according to the measured characteristics of the movement of the operator, in response to the state information about the object, wherein the state information about the object includes information about at least one of a plurality of states of the object comprising a weight of a thing loaded on the object, travelling speed of the object, and a movement direction of the object.

BRIEF DESCRIPTION OF THE DRAWINGS

These and/or other aspects will become apparent and more readily appreciated from the following description of the exemplary embodiments, taken in conjunction with the accompanying drawings, in which.

DETAILED DESCRIPTION

Figure 1:
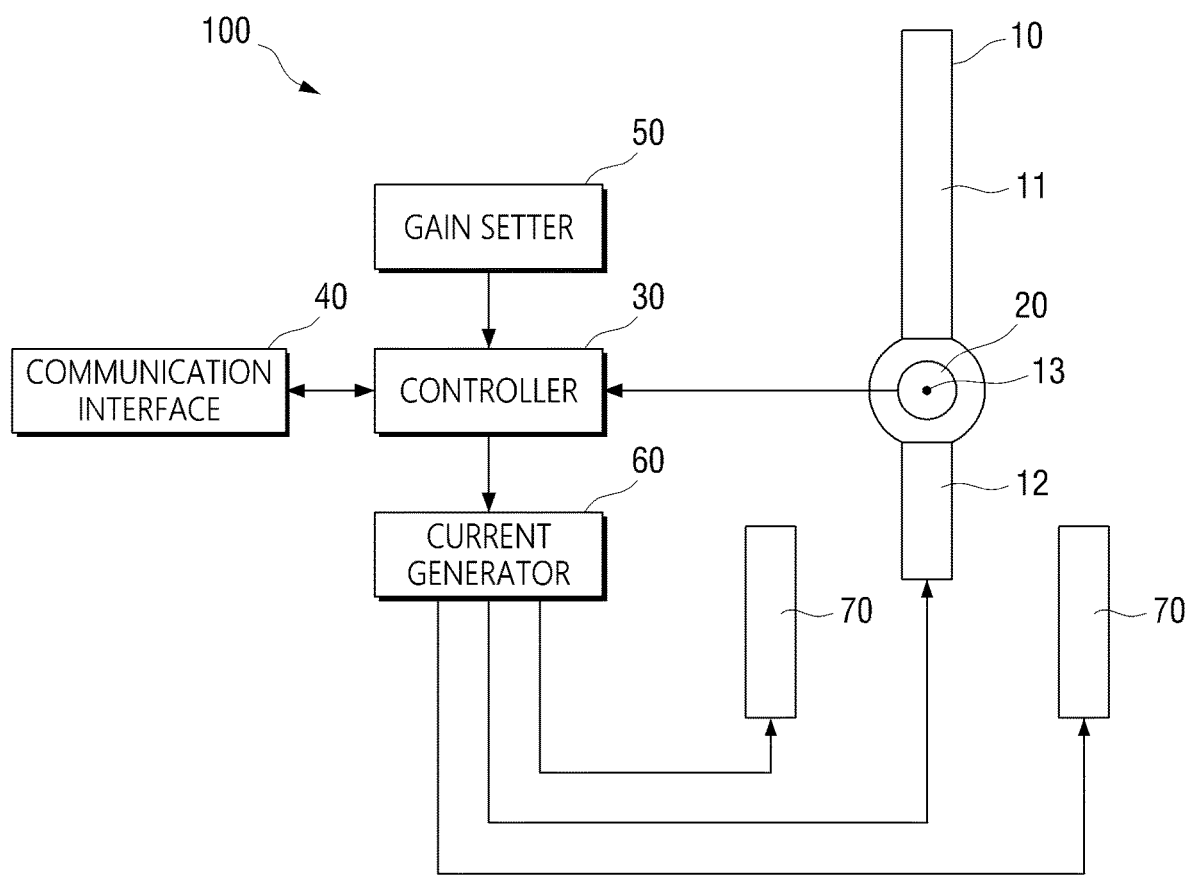
FIG. 1 illustrates a remote controller according to an embodiment.

Advantages and features of the inventive concept may be understood more readily by reference to the following detailed description of exemplary embodiments and the accompanying drawings. The inventive concept may, however, be embodied in many different forms and should not be construed as being limited to the embodiments set forth herein. Rather, these embodiments are provided so that this disclosure will be thorough and complete and will fully convey the inventive concept to those skilled in the art. Like reference numerals refer to like elements throughout the specification.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated elements, but do not preclude the presence or addition of one or more other elements.

It will be understood that, although the terms first, second, third, fourth etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present inventive concept.

Meanwhile, when an exemplary embodiment can be implemented differently, functions or operations described in a particular block may occur in a different way from a flow described in the flowchart. For example, two consecutive blocks may be performed simultaneously, or the blocks may be performed in reverse according to related functions or operations.

An example or exemplary embodiment provided in the following description is not excluded from being associated with one or more features of another example or another exemplary embodiment also provided therein or not provided therein but consistent with the inventive concept. For example, even if matters described in a specific example are not described in a different example thereto, the matters may be understood as being related to the other example, unless otherwise mentioned in descriptions thereof.

Hereinafter, exemplary embodiments of the inventive concept will be described in detail with reference to the accompanying drawings.

FIG. 1 illustrates a remote controller according to an embodiment. A remote controller 100 of FIG. 1 according to an exemplary embodiment may be a device for controlling movement of an object disposed at a remote place or an object in a simulation, and include an operator 10, a movement sensor 20, a controller 30, a communication interface 40, a gain setter 50, a current generator 60 and force feedback generators 70, according to an exemplary embodiment.

The operator 10 may be an element corresponding to a control stick and include a grip 11 as an input interface with a user, according to an exemplary embodiment. However, the inventive concept is not limited thereto, and thus the input interface may be implemented in a form different from the grip 11 shown in FIG. 1. The user may move the operator 10 by holding the grip 11 by hand. The operator 10 may move according to a force applied to the grip 11, and the movement of an object may be controlled according to movement displacement of the operator 10.

The operator 10 may make various movements including a rectilinear movement and a rotational movement according to the force applied to the grip 11.

The operator 10 may rotate about a rotation center 13 according to the force applied to the grip 11. In particular, the operator 10 may pivotally rotate about the rotation center 13.

Figure 2:
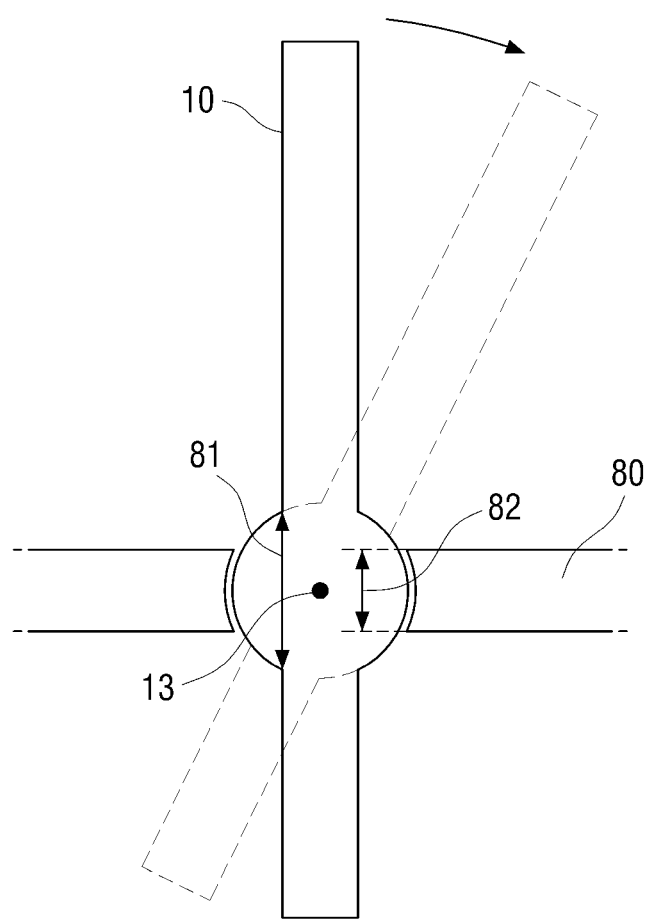
FIG. 2 is a cross-sectional view of an operator installed in a housing of a remote controller according to an exemplary embodiment.

The operator 10 may be pivotally installed in a housing 80 of the remote controller 100 as shown in FIG. 2.

FIG. 2 is a cross-sectional view of the operator 10 installed in the housing 80 of the remote controller 100. Referring to FIG. 2, the operator 10 includes a protrusion that forms a convex surface with respect to the rotation center 13, and the housing 80 includes a hole whose inner surface forms a concave surface having a shape corresponding to the shape of the protrusion.

The operator 10 may be installed in the housing 80 such that it does not move up or down with respect to the rotation center 13. In addition, to make the operator 10 rotatable about the rotation center 13, a length 81 of a convex surface of the protrusion may be greater than a length 82 of a concave surface of the hole, and the convex surface of the protrusion and the concave surface of the hole may have equal or similar curvatures. This configuration enables the operator 10 to pivot about the rotation center 13.

The operator 10 may be installed in the housing 80 in various ways as well as the way illustrated in FIG. 2 so that it can pivot about the rotation center 13. For example, the operator 10 may be installed in the housing 80 by a universal joint so that it can pivot about the rotation center 13.

Referring back to FIG. 1, the operator 10 further includes a force feedback actor 12 located opposite to the grip 11 with respect to the rotation center 13. When a force is applied to the grip 11 by a user, a force feedback is applied to the force feedback actor 12. The force feedback applied to the force feedback actor 12 is transmitted to a hand of the user holding the grip 11, and the user may receive a feedback through the force feedback in response to the force applied to the grip 11.

The force feedback applied to the force feedback actor 12 may be generated by the force feedback actor 12 and the force feedback generators 70. The force feedback actor 12 and the force feedback generators 70 may generate the force feedback using a magnetic force.

A method of generating the force feedback will now be described with reference to FIGS. 3 through 5. Each of the force feedback actor 12 and force feedback generators 71 and 72 may include an electromagnet for generating a magnetic field. The electromagnet may be a solenoid that generates a magnetic field by flowing a current through a coil around a core.

An end of each of the force feedback generators 71 and 72 may be fixedly disposed adjacent to an end of the force feedback actor 12. This takes into account a fact that both ends of an electromagnet have different magnetic poles, and is intended to use magnetic fields generated at the adjacent ends of the force feedback actor 12 and the force feedback generators 71 and 72 to generate a force feedback, and minimize an influence of magnetic fields, generated at the other ends of the force feedback actor 12 and the force feedback generators 71 and 72, on the force feedback. For example, when a north (N) pole is formed at an end of each of the force feedback generators 71 and 72 and the force feedback actor 12, an influence of a south (S) pole, generated at the other end of each of the force feedback generators 71 and 72 and the force feedback actor 12, on the force feedback may be minimized due to the nature of a magnetic force that is inversely proportional to a square of a distance between two objects.

Figure 3:
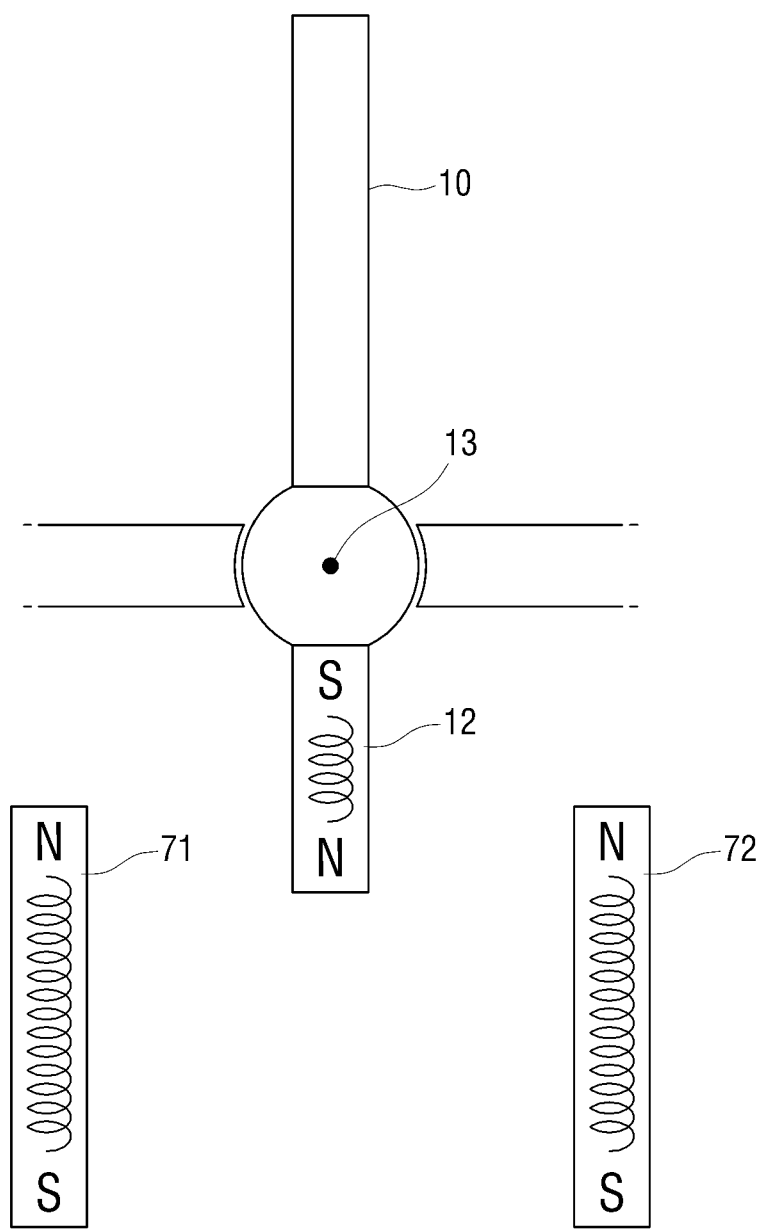
FIGS. 3 and 4 illustrate a method of generating force feedback according to exemplary embodiments.
Figure 4:
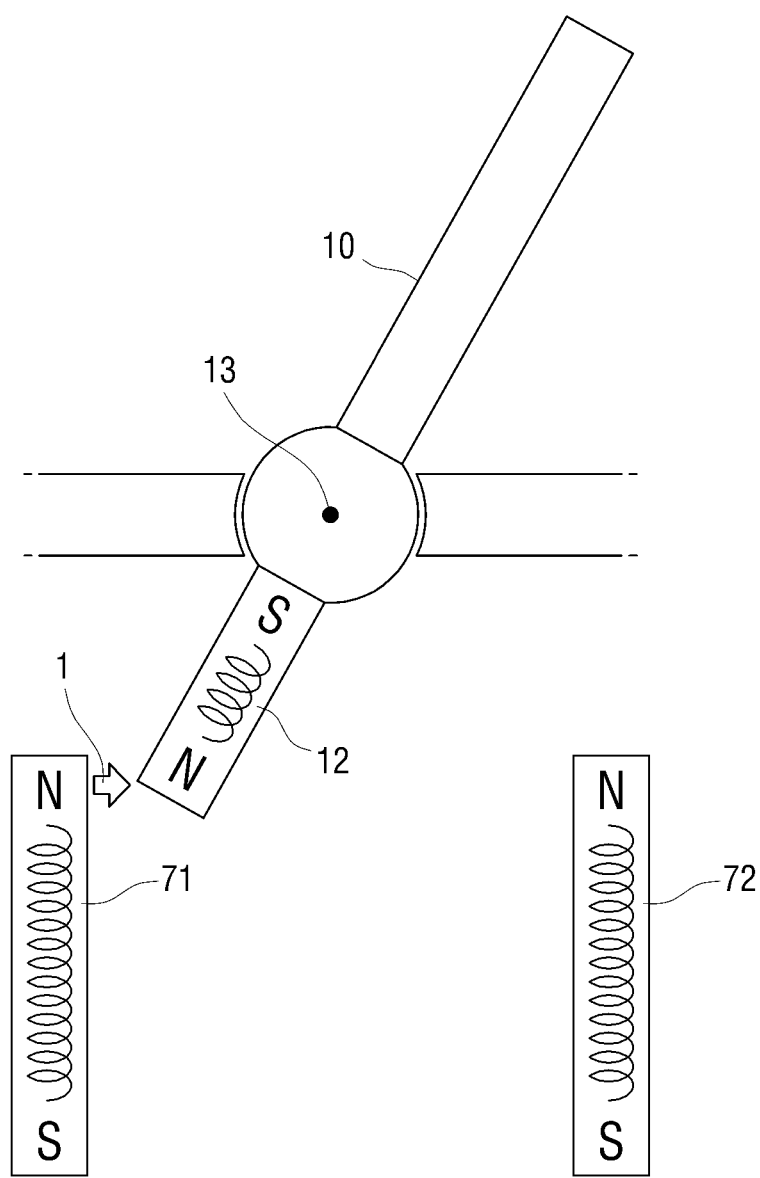

In FIGS. 3 and 4, the force feedback generators 71 and 72 are arranged to generate vertical magnetic fields. However, according to an exemplary embodiment, the force feedback generators 71 and 72 may also be arranged to generate horizontal magnetic fields. Even in this case, an end of each of the force feedback generators 71 and 72 may be fixedly disposed adjacent to an end of the force feedback actor 12.

Magnetic fields of the same magnetic poles may be generated at the end of the force feedback actor 12 and at the end of each of the force feedback generators 71 and 72, so that the force feedback actor 12 is repulsive to the force feedback generators 71 and 72. As shown in FIGS. 3 and 4, magnetic fields are generated when the end of the force feedback actor 12 and the end of each of the force feedback generators 71 and 72 have the N pole. However, magnetic fields may also be formed when the end of the force feedback actor 12 and the end of each of the force feedback generators 71 and 72 have the S pole.

Since a magnetic force is inversely proportional to a square of a distance between two objects, when the force feedback actor 12 approaches one force feedback generator 71 by rotation of the operator 10 as illustrated in FIG. 4, a repulsive force between the force feedback actor 12 and the force feedback generator 71 increases in inverse proportion to a square of a reduced distance between them. On the other hand, the repulsive force between the force feedback actor 12 and the other force feedback generator 72 decreases in inverse proportion to a square of an increased distance between them. Therefore, the force feedback actor 12 receives a force in a direction opposite to its rotation direction, and a force feedback 1 acts on the operator 10 as illustrated in FIG. 4.

The force feedback generators 71 and 72 may also be arranged in a form other than the form illustrated in FIGS. 3 and 4, for example, may be arranged to surround the force feedback actor 12 at a distance so as to generate a force feedback on a pivot motion of the operator 10.

Figure 5:
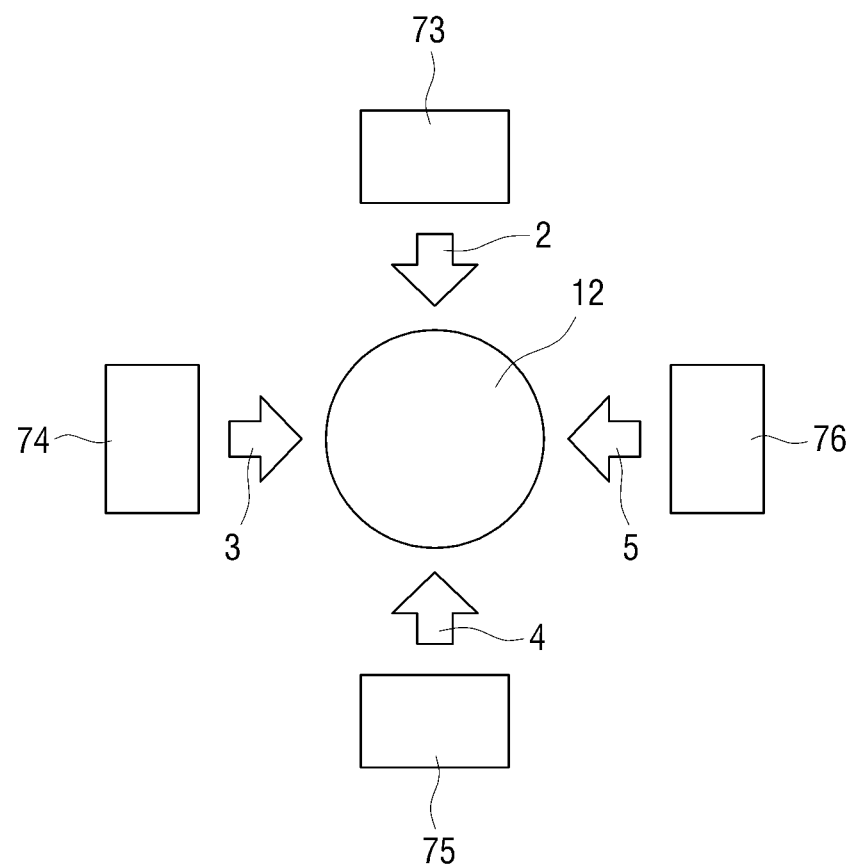
FIG. 5 is a plan view of force feedback generators and a force feedback actor according to an exemplary embodiment.

FIG. 5 is a plan view of force feedback generators and a force feedback actor. In FIG. 5, four force feedback generators are arranged to surround a force feedback actor 12 with respective distances, according to an exemplary embodiment. In FIG. 5, the four force feedback generators are arranged to surround the force feedback actor 12 such that an angular distance of two neighboring force feedback generators is 90 degrees. The force feedback generator placed above the force feedback actor 12 will be referred to as a first electromagnet 73, and the other force feedback generators will be referred to as a second electromagnet 74, a third electromagnet 75, and a fourth electromagnet 76 in a counterclockwise direction about the rotation center 13 of the force feedback actor 12.

A longitudinal force feedback may be generated by the first electromagnet 73 and the third electromagnet 75 arranged to be opposite to each other in a longitudinal direction. A force feedback 2 for pushing the force feedback actor 12 downward may be generated by the first electromagnet 73, and a force feedback 4 for pushing the force feedback actor 12 upward may be generated by the third electromagnet 75. An intensity of a force feedback acting on the force feedback actor 12 in the longitudinal direction may be controlled by adjusting currents flowing through an electromagnet included in the force feedback actor 12, the first electromagnet 73 and the third electromagnet 75.

In addition, a latitudinal force feedback may be generated by the second electromagnet 74 and the fourth electromagnet 76 arranged to be opposite to each other in a latitudinal direction. A force feedback 3 for pushing the force feedback actor 12 to the right may be generated by the second electromagnet 74, and a force feedback 5 for pushing the force feedback actor 12 to the left may be generated by the fourth electromagnet 76. Also, an intensity of a force feedback acting on the force feedback actor 12 in the latitudinal direction may be controlled by adjusting currents flowing through at least one of the second electromagnet 74 and the fourth electromagnet 76. At this time, currents flowing through the electromagnet included in the force feedback actor 12 may also be adjusted to control the intensity of the force feedback in the latitudinal direction.

In addition, an omnidirectional force feedback may be generated by a combination of the longitudinal force feedback and the latitudinal force feedback, and an intensity of the omnidirectional force feedback may be controlled by simultaneously adjusting currents flowing through the first electromagnet 73, the second electromagnet 74, the third electromagnet 75 and the fourth electromagnet 76. At this time, currents flowing through the electromagnet included in the force feedback actor 12 may also be adjusted to control the intensity of the omnidirectional force feedback.

For example, a force feedback of 0.3 N may be generated in the downward direction by adjusting currents flowing through the first electromagnet 73 and the third electromagnet 75, and a force feedback of 0.4 N may be generated in the right direction by adjusting currents flowing through the second electromagnet 74 and the fourth electromagnet 76. Then, a force feedback of 0.5 N may be generated in a lower-right diagonal direction. In this state, a force feedback of 0.6 N may be generated in the downward direction by adjusting currents flowing through the first electromagnet 73 and the third electromagnet 75, and a force feedback of 0.8 N may be generated in the right direction by adjusting currents flowing through the second electromagnet 74 and the fourth electromagnet 76. Then, the force feedback of 0.5 N may be adjusted to 1 N.

In an exemplary embodiment of the configuration in which force feedback generators are arranged to surround the force feedback actor 12 with respective distances, more electromagnets than in the configuration illustrated in FIG. 5 may be arranged to surround the force feedback actor 12 with respective distances. For example, 16 electromagnets may be arranged side by side at equal angular distances to surround the force feedback actor 12 with respective distances. In this configuration, the 16 electromagnets may be respectively disposed at vertices of a regular hexadecagon form having a center at the force feedback actor 12.

Since electromagnets are arranged more densely in this example, the direction in which a force feedback is generated can be finely adjusted. In addition, since four electromagnets are located on each side of the force feedback actor 12 in a lateral direction, an intensity of the force feedback can be adjusted by changing the number of electromagnets to which a current is applied among the four electromagnets.

In the exemplary embodiment of FIG. 5 in which four force feedback generators are arranged to surround the force feedback actor 12 with respective distances, the force feedback generators may be arranged such that the electromagnets 74 and 76 located in the latitudinal direction in FIG. 5 are closer to the force feedback actor 12. Since an intensity of a magnetic force is inversely proportional to a square of a distance between two objects, a greater force feedback may be applied to the force feedback actor 12 by the electromagnets 74 and 76 located in the latitudinal direction than the electromagnets 73 and 75 located in the longitudinal direction even if the same amount of currents are applied to the electromagnets 73 through 76. Therefore, a user can receive a stronger feedback on the latitudinal movement of an object. Accordingly, the user can stably control an object (such as an automobile or an air vehicle) whose latitudinal movement is unstable relative to a longitudinal movement.

Since an electromagnet forms a magnetic field while a current flows through the electromagnet, an intensity and a magnetic pole of the magnetic force of the electromagnet can be adjusted, unlike a permanent magnet. Since the force feedback generators and the force feedback actor 12 generate magnetic forces using electromagnets, currents flowing through the electromagnets may be adjusted to change the magnetic forces, and, ultimately, a force feedback.

The movement sensor 20, the controller 30, the communication interface 40, the gain setter 50 and the current generator 60 which are elements for controlling currents flowing through the electromagnets included in the force feedback actor 12 and the force feedback generators 70 will now be described by referring back to FIG. 1 again.

The movement sensor 20 is a sensor configured to detect and/or measure characteristics of a movement of the operator 10. For example, the movement sensor 20 may measure a movement displacement of the operator 10. The movement sensor 20 may be mounted on the rotation center 13 of the operator 10 to easily measure the movement displacement of the operator 10. The movement displacement measured by the movement sensor 20 includes an amount of a rotation angle of the operator 10 and a rotation direction of the operator 10. However, the inventive concept is not limited thereto. For example, the movement sensor 20 may measure a relative position and/or movement speed of the operator 10 so that the measurement result can be used by the controller 20 to generate a control signal. For brevity of explanation, however, an exemplary embodiment using the movement displacement such as a rotation angle is described below.

The controller 30 is an element configured to generate a control signal for applying and adjusting a current according to the movement displacement of the operator 10 and includes at least one processor. The current generator 60 applies a current to the force feedback generators 70 and the force feedback actor 12 according to the control signal. Then, magnetic fields may be generated in the electromagnets of the force feedback generators 70 by the applied current, and a force feedback may be generated on the operator 10 as described above with reference to FIGS. 3 through 5.

The controller 30 may generate a control signal for adjusting a current so that a force feedback changes according to an amount of a rotation angle of the operator 10 received from the movement sensor 20. Here, the force feedback changing according to the amount of the rotation angle may be a value or a value range preset by a user.

For example, the controller 30 may output a control signal for adjusting a current such that a force feedback 6a changing linearly according to an amount of a rotation angle of the operator 10 is generated. In this case, the user receives the force feedback 6a that is proportional to the amount of the rotation angle of the operator 10. That is, since the user receives a stronger force feedback when the operator 10 rotates more, the user can be prevented from excessively operating the operator 10. Thus, control stability can be improved.

Figure 6:
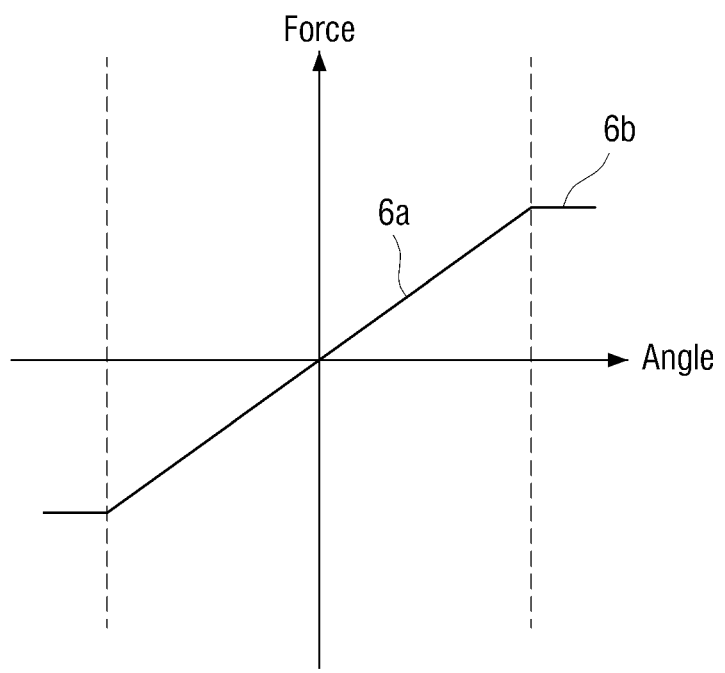
FIG. 6 is a graph of a force feedback changing according to an amount of a rotation angle according to an exemplary embodiment.

In addition, as shown in the graph of FIG. 6, the controller 30 may output a control signal for adjusting a current such that a force feedback 6b of a predetermined magnitude is generated when the amount of the rotation angle of the operator 10 exceeds a threshold value. If a saturation is set for the force feedback in a region where the rotation angle is equal to or greater than a predetermined angle, that is, the threshold value, the controller 30 can be prevented from applying an excessive current.

The force feedback according to the amount of the rotation angle can be set using various relations in addition to the graph illustrated in FIG. 6. For example, an intensity of a force feedback may be set proportional to a square of an amount of a rotation angle so that a stronger force feedback is generated as the rotation angle of the operator 10 increases. In this case, since the intensity of the force feedback increases rapidly as the amount of the rotation angle increases, it is possible to prevent a situation where a user rapidly changes the rotation angle of the operator 10.

In addition, a user can set a force feedback, changing according to an amount of a rotation angle, to a certain value, which is different from an initial set value, through the gain setter 50.

The gain setter 50 is a device that can receive from a user a value of a force feedback or a magnetic force, which changes according to an amount of a rotation angle and/or a weight, which will be described later. The gain setter 50 may include an input device capable of receiving the value of the force feedback from the user. Examples of the input device include a touch pad, a button, and a knob not being limited thereto.

The user may set the value of the force feedback through the gain setter 50 so that a different force feedback is generated depending on a situation. For example, when a remote controller used in an automobile simulator is to be used in a flight simulator, a greater force feedback needs to be applied in order to reflect air resistance acting on an air vehicle. In this case, the user may set a greater value or intensity of a force feedback, which changes according to the magnitude of the rotation angle, through the gain setter 50 so that a stronger force feedback can be generated.

The controller 30 performs a function of generating a control signal for changing a force feedback according to an amount of the rotation angle and a function of generating a control signal for changing a force feedback according to a state of an object.

The communication interface 40 is an element configured to transmit and receive data to and from an object in order to transmit state information about the object to the controller 30. The communication interface 40 may use wireless communication for communication with the object. The wireless communication scheme may include Wi-Fi, Bluetooth, ZigBee, Infrared Data Association (IrDA), and Radio-Frequency Identification (RFID), not being limited thereto. The communication interface 40 may include any one or any combination of a digital modem, a radio frequency (RF) modem, a WiFi chip, and related software and/or firmware.

The state information received from the object by the communication interface 40 includes various information related to movement of the object, such as traveling speed of the object, weight of a thing to be carried by the object, and a movement direction of the object The state information may include information about an operation of the object which is measured by one or more sensors mounted on the object. According to an exemplary embodiment, however, the state information about the object controlled by the remote controller 100 may be obtained from a separate source or sensor such as a camera monitoring the object which is remotely placed, not being limited thereto.

The controller 30 may generate a control signal for changing a force feedback according to the state information about the object, and may set a control signal such that a weight is selectively applied to the force feedback according to the state of the object. The weight may be an initial set value or a different value set by the user using the gain setter 50.

Figure 7:
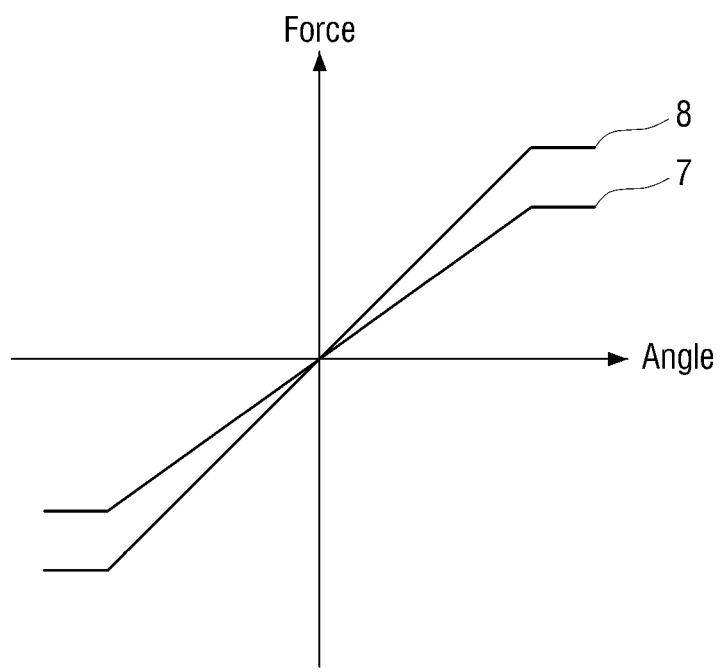
FIG. 7 is a graph of a force feedback before and after a weight is applied according to an exemplary embodiment.

FIG. 7 illustrates a force feedback before and after a weight is applied. A first force feedback 7 in FIG. 7 represents a force feedback before a weight is applied, and a second force feedback 8 represents a force feedback after the weight is applied. The second force feedback 8 may be generated by multiplying the first force feedback 7 by a weight of a constant value for all rotation angles.

In addition to the above method, various other methods can be used to apply a weight to a force feedback. For example, a weight may not be applied to a region where a saturation of the force feedback is set, so that the first force feedback 7 and the second force feedback 8 have a same amount. Alternatively, a weight linearly proportional to an amount of a rotation angle may be set, so that a greater weight is multiplied as the rotation angle increases.

If a weight is applied, a user feels a stronger force feedback even when operating the operator 10 in the same manner as before. A case where a weight is selectively applied according to state information will now be described using some examples.

A first example is a case where information about weight of a thing carried by an object is received from the object as state information. When the received weight of the thing exceeds a reference value, the controller 30 may generate a control signal to which a weight is applied in order to provide a user with a feedback indicating that a large load is acting on the object. On the other hand, when the received weight of the thing is less than the reference value, the controller 30 may generate a control signal to which the weight is not applied.

In the first example, the user can determine whether a considerable load is acting on the object through a difference in an intensity of a force feedback according to the weight. In this case, the user may receive a feedback through a weighted force feedback such as an increased magnetic force so that the user can operate the operator 10 not to generate an excessive command by considering the load applied to the object, thereby preventing a failure or breakage of the object.

A second example is a case where traveling speed is received from an object as the state information. When the received speed exceeds a reference value, the controller 30 may output a control signal to which a weight is applied in order to provide a user with a feedback indicating that the object is traveling at high speed. On the other hand, when the received speed is less than the reference value, the controller 30 may generate a control signal to which the weight is not applied.

In the second example, the user can determine whether the object is traveling at high speed through a difference in an intensity of a force feedback according to the weight. In addition, since a restoring force of the operator 10 is increased by a weighted force feedback, the user can apply a more stable control input when the object travels at high speed.

A third example is a case where information about a direction of movement of an object is received from the object as the state information. When a rotation direction of the operator 10 measured by the movement sensor 20 does not coincide with the received movement direction, the controller 30 may generate a control signal to which a weight is applied in order to provide a user with a feedback indicating that the user is instructing the object to move in a direction different from the movement direction of the object. On the other hand, when the received movement direction coincides with the rotation direction of the operator 10, the controller 30 may generate a control signal to which the weight is not applied.

In the third example, the user can determine whether the user is instructing the object to move in a direction different from the movement direction of the object through a difference in an intensity of a force feedback according to the weight. When the user instructs the object to move in a direction different from the movement direction of the object, the user may immediately receive a feedback through a weighted force feedback such as an increased magnetic force and modify the rotation direction of the operator 10 so that the object can maintain its original movement direction.

If a weight is applied as in the three examples described above, the user feels a greater force feedback even when operating the operator 10 in the same manner as before. Therefore, information such as speed, weight or load, and a movement direction of the object can be fed back to the user. Accordingly, the user can control the object by reflecting the fed back information and issue a control command suitable for the state of the object, thereby increasing control stability and maneuverability.

In the above three example, a weight is applied or not according to the state information about the object. However, according to an exemplary embodiment, different weights may be applied according to the state information about the object. Also, according to an exemplary embodiment, whether to apply a weight or different weights may be determined according to information about a combination of two or more states of the object.

When the state information received from the communication interface 40 indicates that the object is not in an operable state or when the state information cannot be received, the controller 30 may output a control signal for generating a maximum force feedback or a maximum magnetic force (hereafter referred to as "a maximum force feedback"). When a feedback on whether the object is in the operable state or whether information required for control is being normally received is provided to the user at a remote place through the maximum force feedback, the user may issue a control command suitable for the state of the object or may not issue a control command, thereby preventing a failure or breakage of the object.

The maximum force feedback may be a force feedback generated according to a maximum current that can be applied by the current generator 60. Alternatively, the maximum force feedback may be a force feedback generated by applying a maximum current in a current range set by a user. That is, the maximum force feedback refers to a force feedback that makes the user feel a strong resistance when operating the operator 10 or a force feedback that is intense enough to make the user unable to operate the operator 10.

Figure 8:
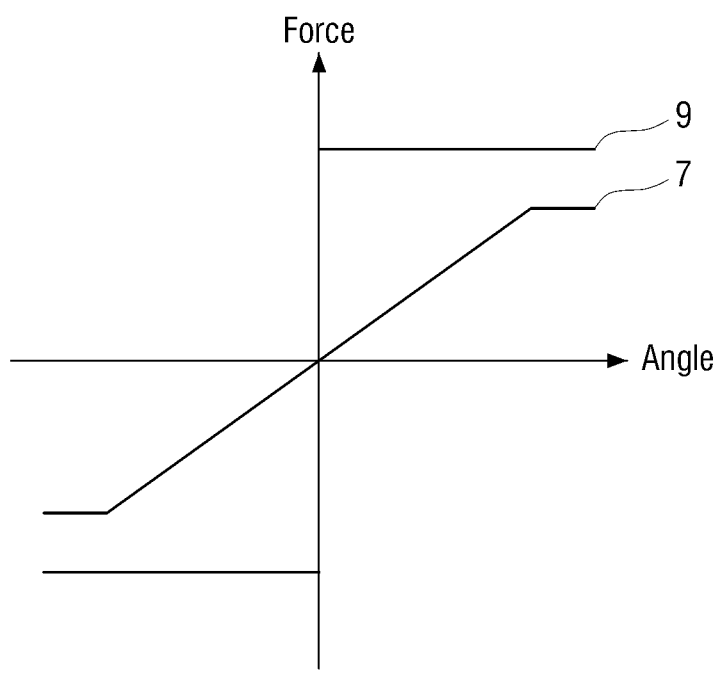
FIG. 8 is a graph of a force feedback before a weight is applied and a maximum force feedback according to an exemplary embodiment.

FIG. 8 is a graph illustrating the first force feedback 7 of FIG. 7 and a maximum force feedback 9 together. The first force feedback 7 represents a force feedback changing according to an amount of a rotation angle of the operator 10, and the maximum force feedback 9 represents a force feedback generated according to a maximum current applied. Referring to FIG. 8, the maximum force feedback 9 has a value greater than a maximum value of the first force feedback 7 and is set to have a constant value with respect to the amount of the rotation angle of the operator 10. Unlike the case illustrated in FIG. 8, the maximum force feedback 9 may have a different value or values and a different graphical shape according to a user setting.

When the maximum force feedback 9 is applied, the user feels a stronger resistance than when operating the operator 10 according to the first force feedback 7. Therefore, through the maximum force feedback 9 transmitted through the operator 10, the user can receive a feedback on whether an object is in an operable state or whether state information about the object can be received.

A case where the maximum force feedback 9 is applied according to state information about the object or when the state information about the object cannot be received will now be described using some examples.

A first example is a case where information about weight of a thing carried by an object is received from the object as state information. When the received weight exceeds a maximum weight that can be carried by the object, the controller 30 may generate a control signal for generating the maximum force feedback in order to provide a user with a feedback indicating that the object is not in an operable state because a maximum load is acting on the object.

In the first example, the user may receive a feedback on whether the maximum load is acting on the object, through the maximum force feedback. Therefore, the user may not operate the operator 10 or may not issue an excessive command to the operator 10, thereby preventing a failure or breakage of the object.

A second example is a case where information about a resistance to travel of the object is received from the object as the state information. There may be two types of resistance to travel. The first is an external resistance including an air resistance and a resistance applied according to a slope of a ground on which the object travels and the ground state. The second is an internal resistance including a resistance applied by a braking operation on the object.

The resistance to travel may be a numerical value calculated based on information about travelling speed of the object received by the communication interface 40 from a sensor mounted on the object. If the travelling speed of the object is lower than speed applied through the operator 10, a resistance to the travel of the object may be calculated based on a difference between the applied speed and the travelling speed. Alternatively, if a speed sensor or a tilt sensor is mounted on the object, a resistance measured through the speed sensor and the tilt sensor may be received by the communication interface 40.

When the resistance to the travel of the object exceeds a maximum value which may be set by the user through the gain setter 50 in advance, the controller 30 may output a control signal to generate the maximum force feedback in order to provide a user with a feedback indicating the excessive resistance received by the object.

In the second example, the user can determine whether the object is in a state where it can travel, through the maximum force feedback. Therefore, the user can allow the object to travel appropriately according to the state the object is in by not operating the operator 10 or not issuing an excessive command to the operator 10.

A third example is a case where state information cannot be received from the object. The case where the state information cannot be received from the object includes a case where communication with the object is lost and a case where the state information cannot be grasped based on information received from the object. For example, if information obtained by measuring a state of a ground on which the object is traveling is received from a vision sensor of the object as the state information, the case where the state information be received from the object may be when measured information cannot be received due to a communication failure or when the ground state information cannot be grasped even if the measured information is received.

In such a case, the controller 30 may generate a control signal for generating the maximum force feedback in order to provide a user with a feedback indicating that information necessary for controlling the object is not being received.

In the third example, the user can determine whether the state information is being normally received from the object, through the maximum force feedback. Since controlling the object when the state information is not being normally received can cause a failure or an accident, occurrence of a dangerous situation can be prevented by providing the user with a feedback indicating the situation, through the maximum force feedback.

If the maximum force feedback is applied as in the three examples described above, the user can receive feedback, through the operator 10, on whether the object is in an operable state and whether the state information is being received from the object. Therefore, the user can issue a control command suitable for the state of the object by reflecting the feedback information, thereby increasing control stability and maneuverability.

Until now, the method of generating a force feedback and the method of changing the force feedback according to a rotation angle of the operator 10 and state information about an object have been described. Exemplary embodiments in which the above-described methods are applied to a robot carrying a thing and a travelling robot will be described with reference to FIGS. 9 and 10.

Figure 9:
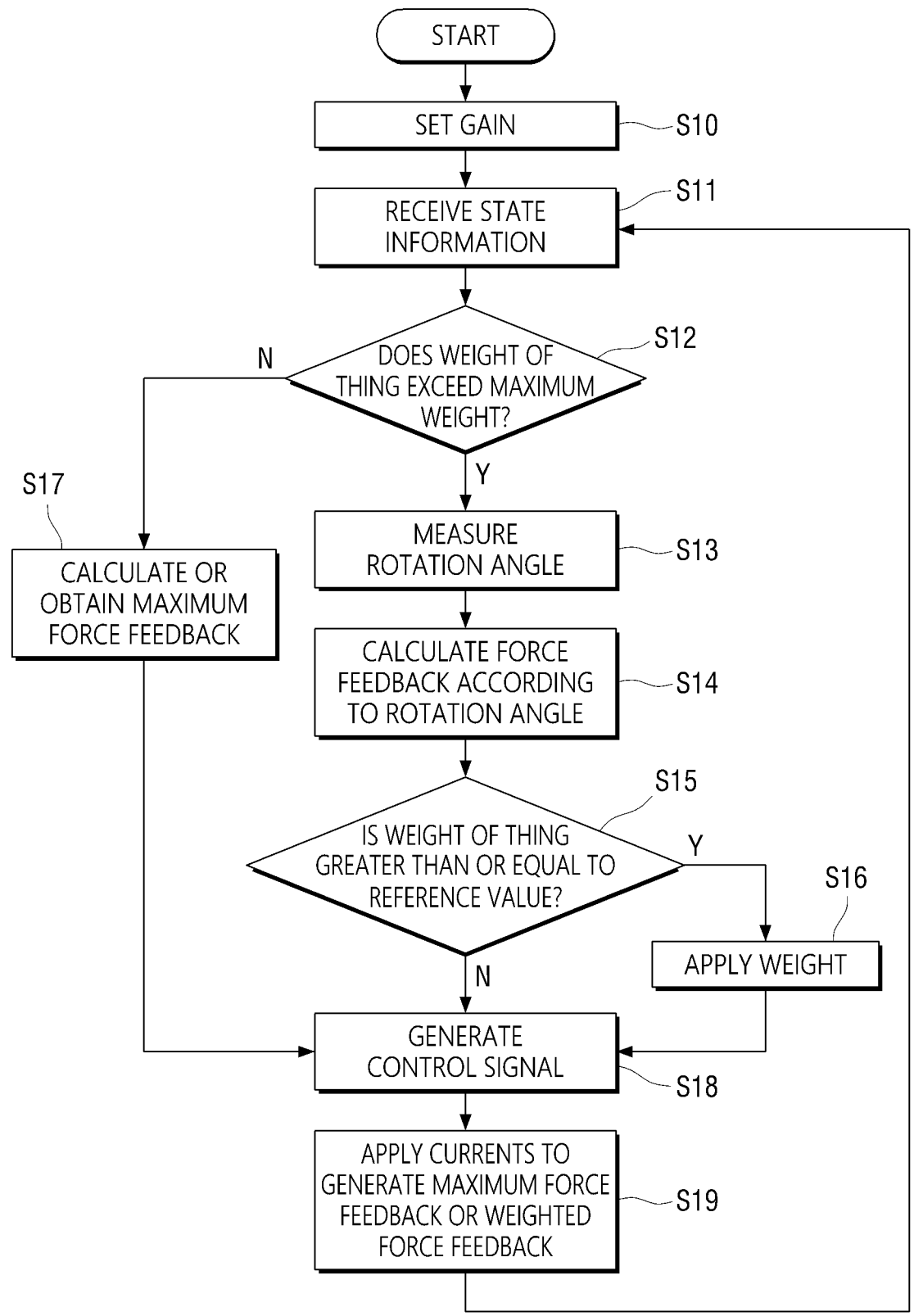
FIG. 9 is a flowchart illustrating a method of generating a force feedback when controlling a robot that carries a thing according to an exemplary embodiment.

FIG. 9 is a flowchart illustrating a method of generating a force feedback when controlling a robot that carries a thing. The method is described in reference to FIG. 1.

First, a gain, that is, a value of a force feedback or a magnetic force, which changes according to an amount of a rotation angle of an operator, and a value of a weight, which is applied to the force feedback, are set through the gain setter 50 (operation S10). The force feedback which changes according to the amount of the rotation angle was described with reference to FIG. 6, and the weight was described with reference to FIG. 7. The gain setting operation includes allowing a user to initially set the value of the force feedback and the value of the weight or changing the values initially set by the user through the gain setter 50 of the remote controller 100.

The communication interface 40 receives information about weight of a thing loaded on the robot as state information of the robot (operation S11).

The controller 30 determines whether the thing can be carried by the robot based on the received weight information about the thing on the robot (operation S12). That is, whether the weight of the thing exceeds a maximum weight that can be carried by the robot may be determined. This maximum weight may also be set by the user through the gain setter 50 in advance.

If it is determined that the received weight exceeds the maximum weight that can be carried by the robot, a maximum force feedback is calculated or obtained, which may be used to prevent the user from operating the operator 10 (operation S17). This maximum force feedback may also be set by the user through the gain setter 50 in advance.

If it is determined that the weight does not exceed the maximum weight, a rotation angle of the operator 10 operated by the user is measured (operation S13). The rotation angle may be measured by the movement sensor 20.

The controller 30 calculates a force feedback according to the amount of the measured rotation angle (operation S14). The force feedback may be calculated based on the value of the force feedback set by the user in the gain setting operation S10.

Next, the controller 30 determines whether the weight of the thing loaded on the robot is equal to or greater than a reference value (operation S15).

If it is determined that the weight of the thing is less than the reference value, a weight is not applied to the calculated force feedback. However, if it is determined that the weight of the thing is greater than or equal to the reference value a, the weight is applied to the calculated force feedback in order to provide the user with a feedback indicating that a strong load is acting on the robot (operation S16).

The controller 30 outputs a control signal for generating currents corresponding to the maximum force feedback or the weighted force feedback (operation S18).

The current generator 60 applies the currents to the force feedback actor 12 and the force feedback generators 70 according to the control signal so that the maximum force feedback or the weighted force feedback is generated by the force feedback actor 12 and the force feedback generators 70, and applied to the force feedback actor 12 (operation S19).

The above process may be repeated whenever the communication interface 40 receives new state information about the robot.

Figure 10:
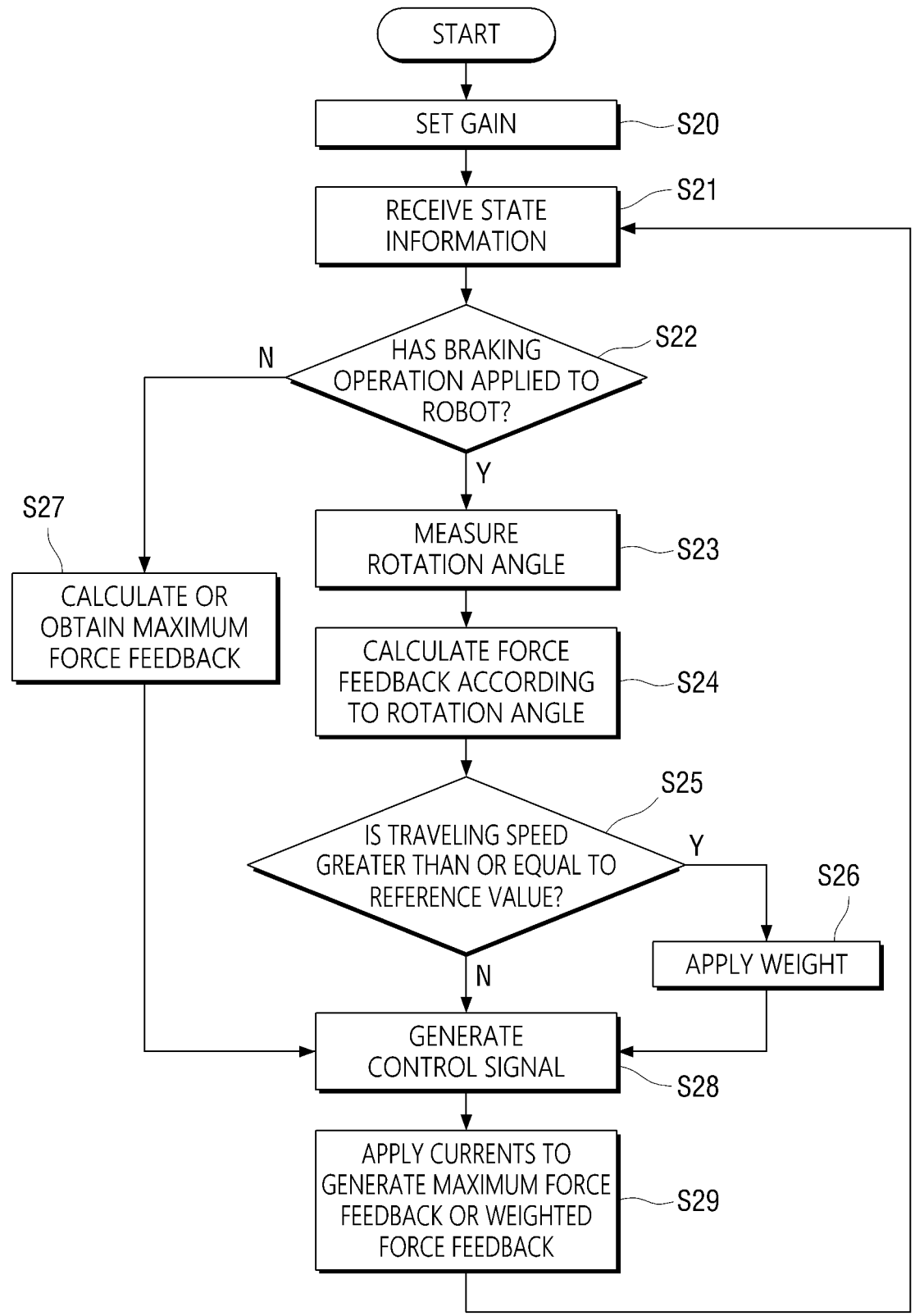
FIG. 10 is a flowchart illustrating a method of generating a force feedback when controlling a travelling robot according to an exemplary embodiment.

FIG. 10 is a flowchart illustrating a method of generating a force feedback when controlling a travelling robot. The method is described in reference to FIG. 1.

In a gain setting operation S20, a value of a force feedback, which changes according to an amount of a rotation angle of the operator 10 of the remote controller 100 and a weight to be applied to the force feedback are set through the gain setter 50.

The communication interface 40 receives traveling speed and a brake status of the robot as state information of the robot (operation S21).

The controller 30 determines whether the robot can travel based on the received state information (operation S22). Specifically, the controller 30 may determine whether a braking operation has been applied to the robot.

If it is determined that a braking operation is applied to the robot, a maximum force feedback is calculated or obtained, which may be used to prevent the user from operating the operator 10 (operation S27). This maximum force feedback may also be set by the user through the gain setter 50 in advance.

If it is determined that the robot can travel because the braking operation is not applied to the robot, the movement sensor 20 measures a rotation angle of the operator 10 operated by the user (operation S23).

The controller 30 calculates a force feedback corresponding to the amount of the measured rotation angle (operation S24). The force feedback may be calculated based on the value of the force feedback set by the user in the gain setting operation S20.

Next, the controller 30 determines whether the travelling speed of the robot is equal to or greater than a reference value (operation S25).

If it is determined that the travelling speed of the robot is less than the reference value, a weight is not applied to the calculated force feedback. However, if it is determined that the travelling speed is greater than or equal to the reference value, the weight is applied to the calculated force feedback in order to provide the user with a feedback indicating that the robot is travelling at high speed (operation S26).

The controller 30 outputs a control signal for generating currents corresponding to the maximum force feedback or the weighted force feedback (operation S28).

The current generator 60 applies the currents to the force feedback actor 12 and the force feedback generators 70 according to the control signal so that the maximum force feedback or the weighted force feedback is generated by the force feedback actor 12 and the force feedback generators 70, and applied to the force feedback actor 12 (operation S29).

The above process may be repeated whenever the communication interface receives new state information about the robot.

In the above exemplary embodiments, both the force feedback actor 12 and the force feedback generators 70 are formed as electromagnets. However, the inventive concept can also be applied to a case where one of the force feedback actor 12 and the force feedback generators 70 is implemented by a permanent magnet and the other(s) is implemented by an electromagnet. In this case, currents applied to the electromagnet may be adjusted to change a force feedback.

Exemplary embodiments of the inventive concept provide at least one of the following advantages.

Since electromagnets are used to generate a force feedback, a remote controller can be miniaturized. Therefore, a force feedback applied remote controller can be used as a portable device.

In addition, since electromagnets are used to generate a force feedback, the force feedback can be changed by adjusting currents flowing through the electromagnets.

Furthermore, information about a state of an object can be fed back to a user by changing a force feedback according to the state of the object. The user can control the object by reflecting the feedback information and issue a control command suitable for the state of the object, thereby increasing control stability and maneuverability.

The operations or steps of the methods or algorithms described above can be embodied as computer readable codes on a computer readable recording medium, or to be transmitted through a transmission medium. The computer readable recording medium is any data storage device that can store data which can be thereafter read by a computer system. Examples of the computer readable recording medium include read-only memory (ROM), random-access memory (RAM), compact disc (CD)-ROM, digital versatile disc (DVD), magnetic tape, floppy disk, and optical data storage device, not being limited thereto. The transmission medium can include carrier waves transmitted through the Internet or various types of communication channel. The computer readable recording medium can also be distributed over network coupled computer systems so that the computer readable code is stored and executed in a distributed fashion.

At least one of the components, elements, modules or units (collectively "components" in this paragraph) represented by a block in the drawings such as FIG. 1 may be embodied as various numbers of hardware, software and/or firmware structures that execute respective functions described above, according to an exemplary embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

However, the above aspects of the exemplary embodiments are not restricted to those set forth herein. The above and other aspects of the exemplary embodiments will become more apparent to one of daily skill in the art to which the inventive concept pertains by referencing the claims.

While the inventive concept has been particularly shown and described with reference to exemplary embodiments thereof, it will be understood by those of ordinary skill in the art that various changes in form and detail may be made therein without departing from the spirit and scope of the inventive concept as defined by the following claims. The exemplary embodiments should be considered in a descriptive sense only and not for purposes of limitation. The meanings and scope of the claims, and all modifications or modified shapes, which are derived from equivalent concepts thereof, should be understood as being included in the scope of the inventive concept.

What is claimed is:

1. A remote controller for controlling an object placed in a remote location, the remote controller comprising:
   a communication interface configured to form a communication channel with the object;
   an operator comprising an input interface configured to receive a user input, and a force feedback actor comprising a first magnet;
   a movement sensor configured to detect a movement of the operator generated by the user input, and measure characteristics of the movement of the operator;
   a controller configured to control the object through the communication interface, and generate a control signal according to the detected movement of the operator;
   a current generator configured to generate a current according to the control signal; and
   a force feedback generator comprising at least one second magnet configured to receive the generated current, thereby to generate a magnetic force as a force feedback which is applied to the force feedback actor,
   wherein the controller is further configured to control the current generator to adjust the current according to the measured characteristics of the movement of the operator, and the force feedback generator is configured to, in response to the adjusted current, generate a different magnetic force changing the force feedback, wherein the communication interface is configured to receive state information about the object, wherein the controller is configured to control the current generator to adjust the current according to both the measured characteristics of the movement of the operator and the state information about the object, and wherein the controller is configured to generate a control signal for generating a maximum magnetic force when a value of the state information exceeds a predetermined maximum value.

2. The remote controller of claim 1, wherein the characteristics of the movement of the operator comprises at least one of an amount of a movement displacement, a relative position, and movement speed of the object.

3. The remote controller of claim 1, wherein the state information about the object comprises at least one of a weight of a thing loaded on the object, travelling speed of the object, and a movement direction of the object.

4. The remote controller of claim 1, further comprising a gain setter configured to preset the different magnetic force, the maximum magnetic force and the predetermined maximum value.

5. The remote controller of claim 1, wherein the controller is further configured to selectively apply a weight according to the state information about the object to control the current generator to adjust the current according to the state information about the object.

6. The remote controller of claim 5, further comprising a gain setter configured to preset the weight.

7. A remote controller for controlling an object placed in a remote location, the remote controller comprising:
- a communication interface configured to form a communication channel with the object;
- an operator comprising an input interface configured to receive a user input, and a force feedback actor comprising a first magnet;
- a movement sensor configured to detect a movement of the operator generated by the user input, and measure characteristics of the movement of the operator;
- a controller configured to control the object through the communication interface, and generate a control signal according to the detected movement of the operator;
- a current generator configured to generate a current according to the control signal; and
- a force feedback generator comprising at least one second magnet configured to receive the generated current, thereby to generate a magnetic force as a force feedback which is applied to the force feedback actor, wherein the controller is further configured to control the current generator to adjust the current according to the measured characteristics of the movement of the operator, and the force feedback generator is configured to, in response to the adjusted current, generate a different magnetic force changing the force feedback, wherein the communication interface is configured to receive state information about the object, wherein the controller is configured to control the current generator to adjust the current according to both the measured characteristics of the movement of the operator and the state information about the object, wherein the controller is further configured to selectively apply a weight according to the state information about the object to control the current generator to adjust the current according to the state information about the object, and wherein the controller is configured to apply the weight when a value of the state information is equal to or greater than a reference value, and not to apply the weight when the value of the state information is less than the reference value.

8. The remote controller of claim 1, wherein the first magnet is configured to generate another magnetic force in response to another current generated by the current generator according to the control signal of the controller.

9. The remote controller of claim 8, wherein the second magnet comprises a plurality of second magnets surrounding the force feedback actor with respective distances such that an end of each of the second magnets is disposed adjacent to an end of the first magnet.

10. The remote controller of claim 9, wherein the current generator is configured to generate the current such that magnetic forces of the same pole are generated at the ends of the second magnets and the end of the force feedback actor.

11. The remote controller of claim 1, wherein the input interface of the operator comprises a grip configured to receive the user input and rotate about a rotation center of the operator according to the user input.

12. The remote controller of claim 11, wherein the characteristics of the movement of the operator comprises an amount of a rotation angle of the operator and a rotation direction of the operator, and the controller is configured to control the current generator to adjust the current according to the amount of the rotation angle and the rotation direction.

13. The remote controller of claim 11, wherein the movement sensor is provided at the rotation center.

14. The remove controller of claim 1, wherein the first magnet included in the force feedback actor is a permanent magnet, and the second magnet included in the force feedback generator is an electromagnet.

15. A remote controller for controlling an object placed in a remote location, the remote controller comprising:
- a communication interface configured to form a communication channel with the object;
- an operator comprising an input interface configured to receive a user input, and at least one first magnet;
- a movement sensor configured to detect a movement of the operator generated by the user input, and measure characteristics of the movement of the operator;
- at least one second magnet disposed around the first magnet;
- a controller configured to, in response to the detection of the movement, apply a current to at least one of the first magnet and the second magnet to generate a magnetic force applied to the operator, wherein the controller is further configured to adjust the current to change the magnetic force according to the measured characteristics of the movement of the operator, wherein the controller is further configured to receive state information about the object being controlled by the remote controller, and apply a weight to the magnetic force changed according to the measured characteristics of the movement of the operator, in response to the state information about the object, wherein the controller is configured to adjust the current to generate a maximum magnetic force when a value of the state information exceeds a predetermined maximum value.

16. The remote controller of claim 15, wherein the state information about the object comprises information about at least one of a plurality of states of the object comprising a weight of a thing loaded on the object, travelling speed of the object, and a movement direction of the object.

\* \* \* \* \*